United States Patent [19]
Wang et al.

[11] Patent Number: 6,019,706
[45] Date of Patent: Feb. 1, 2000

[54] MECHANISM TO THE ELECTRONIC CONTROL PANEL OF TREADMILLS

[75] Inventors: Leao Wang; Peter Wu, both of Taichung, Taiwan

[73] Assignee: Greenmaster Industrial Corp., Taiping, Taiwan

[21] Appl. No.: 09/048,790

[22] Filed: Mar. 27, 1998

[51] Int. Cl.$^7$ ................................................. A63B 22/00
[52] U.S. Cl. ................................. 482/54; 482/2; 482/902
[58] Field of Search .............................. 482/1–9, 51, 54, 482/57, 62, 900–902; 434/247

[56] References Cited

U.S. PATENT DOCUMENTS

| | | | |
|---|---|---|---|
| 5,114,391 | 5/1992 | Pitzen et al. | 482/2 |
| 5,256,115 | 10/1993 | Scholder et al. | 482/6 |
| 5,542,893 | 8/1996 | Peterson et al. | 482/57 |

*Primary Examiner*—Glenn E. Richman

[57] ABSTRACT

An improved mechanism to the electronic control panel of treadmills includes a main electronic control board which including a framework, a main control board, and a base plate. The main control board is assembled at a receiving slot in the center of the framework, while on one side of the receiving slot, an elongated groove is furnished, which is connected and fastened to the main control board so that it joins the opposite side of the main control board to form a gliding slot for the motor speed-control button. In the mean time, one side wall beneath the main control board near the gliding slot is equipped with an adjustable resistor that controls the motor operating cycle, and the adjustable resistor is made in a paralleled condition to the sliding slot, while the lever is extended towards outside. In such configuration, it serves to engage the shaft receptacle at the motor speed control button to complete the assembly. The lever is exposed outside the gliding slot so that the shaft of the adjustable resistor is not located on the same vertical surfaces as that of the gliding slot as the main feature.

3 Claims, 2 Drawing Sheets

MECHANISM TO THE ELECTRONIC CONTROL PANEL OF TREADMILLS

BACKGROUND OF THE INVENTION

The present invention relates to an improved mechanism to the electronic control panel of treadmills, to more particularly, it refers to an effective mechanism that prevents liquid from dripping into the adjustable resistor and results in damages to the electronic circuitry and maintain the operating cycle of the electronic circuitry.

In terms of all current electronic operated treadmills, their electronic instrument control boards are all located at the most upper position of the handrail at the front side of the unit so that the user may conveniently look at the various exercise reference figures being displayed at any time, while the control button atop the control board may be utilized for changing the check item being displayed on the instrument board. On the electronic instrument control panel, a gliding slot with a motor speed-control button is installed, and the bottom of the speed-control button is engaged to the control lever of an adjustable resistor. As a result, when the speed-control button is shifted, it carries the control lever of the adjustable resistor for a synchronized movement to modify the operating cycle of the motor to further control the speed of the track.

The foregoing described motor speed-control button does not generate any inconvenience in the operation. The control lever of the adjustable resistor is located on the same surface at a 90 degree angle to where the gliding slot is located. As a result, liquids, especially referring to the exerciser's perspiration during exercising or an accidentally overturned beverage, tend to trickle down along the gliding slot following the speed-control button and the control lever, and drip onto the adjustable resistor to bring moisture to that electronic component which results in short-circuit and malfunction.

SUMMARY OF THE INVENTION

The primary objective of the present invention is to provide a mechanism that prevents liquid from dripping into the adjustable resistor to cause damage to the electronic circuitry. Therefore, the adjustable resistor control lever and its siding slot are not installed on the same vertical surface in order to maintain its operating cycle.

BRIEF DESCRIPTION OF THE DRAWINGS

The forgoing and other features and advantages of the present invention will be more clearly understood from the following detailed description and the accompanying drawings, in which.

DETAILED DESCRIPTION OF THE PREFERRED EMBODIMENT

Figure 1:
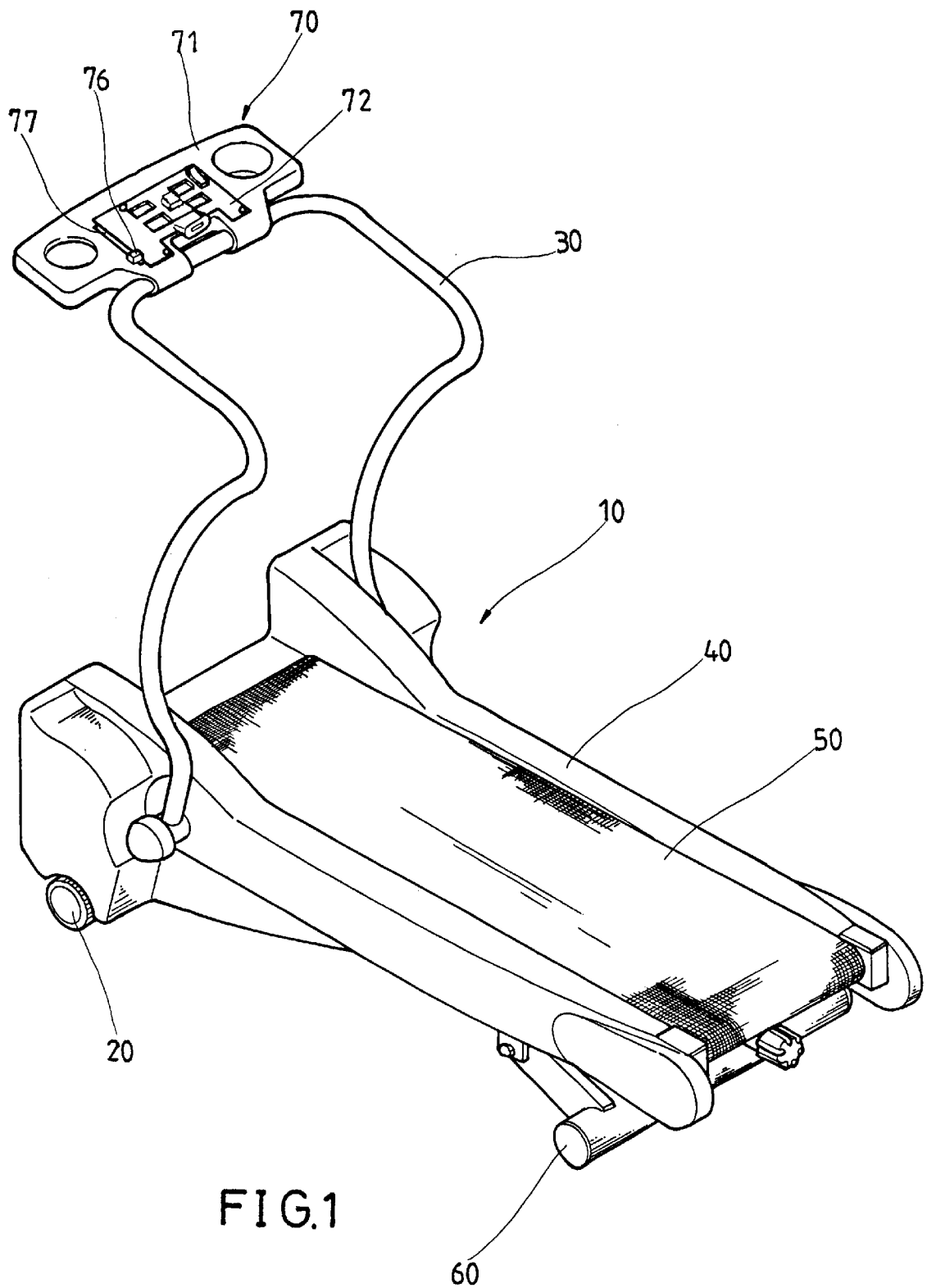
FIG. 1 is a perspective view of a treadmill according to the present invention.
Figure 2:
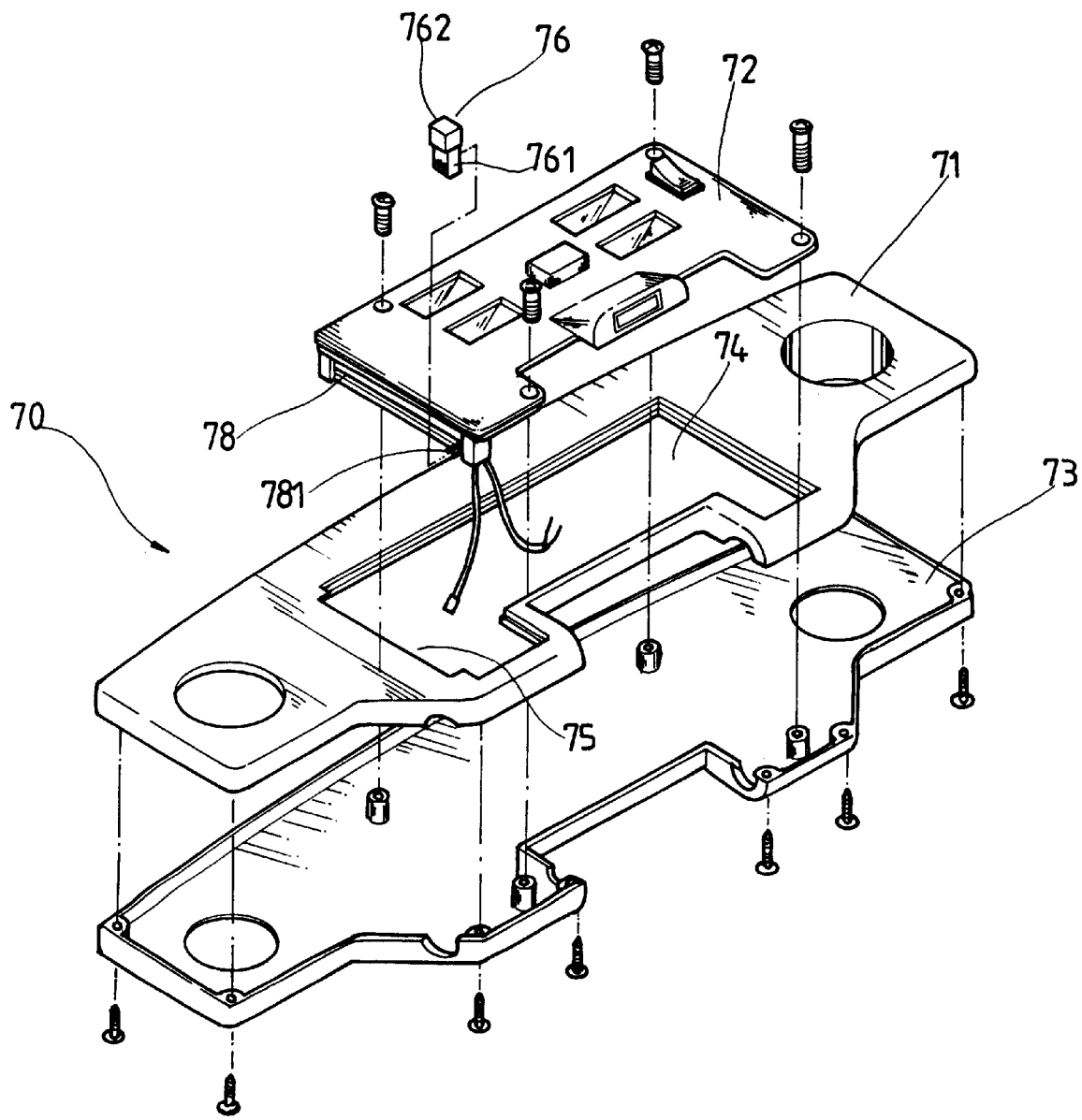
FIG. 2 is an exploded view of the electronic control panel according to the present invention.

Referring to FIGS. 1 and 2, therein illustrated is a treadmill embodying the present invention, which is generally comprised of a mainframe 10, a front support bar 20, a handrail 30, a frame 40, a running base 50, and a rear support bar 60. An electronic instruction board 70 includes a framework 71, a main control board 72, and a base plate 73. An elongated slot 75 is furnished on one side of a receiving slot 74 so that when the main control board 72 is mounted and secured, it joins the corresponding edge, opposite the main control board 72 to form a gliding slot 77 for the motor speed-control button 76. In the mean time, on the side wall beneath the main control board 72 near the gliding slot 77, an adjustable resistor 78 and the gliding slot 77 are made in a parallel configuration. A control lever 781 extends outward towards the gliding slot 77. As a result, it can be connected with the shaft receptacle 761 of the motor speed-control button 76 at the position where the gliding slot 77 is to complete the assembly. At this time, the control lever 762 of the motor speed-control button 76 is exposed outside the gliding slot 77, and the control lever 781 of the adjustable resistor 78 and the gliding slot are not located in the same vertical plane.

By utilizing the aforementioned structural design, when liquid trickles down the gliding slot 77, the liquid will drop down the shaft receptacle 761 at the motor speed-control button 76, and will not contact the adjustable resistor 78 directly. Therefore, the adjustable resistor 78 can be consistently kept dry without moisture, thus naturally no damage can be result to the operation.

It is understood by those skilled in the art that the foregoing description is a preferred embodiment of the disclosed device and that various changes and modifications may be made in the invention without departing from the spirit and scope thereof.

What is claimed is:

1. An electronic control panel for an exercise device and comprising:

a) a framework configured to be mounted on the exercise device, the framework having a receiving opening;

b) a control board mounted on the framework in the receiving opening, a side of the control board and a side of the receiving opening forming an elongated slot therebetween;

c) a control button having a portion extending through the elongated slot, the control button being movable along the elongated slot; and, d) a variable resistor mounted on the control board so as to be located out of alignment with the elongated slot, the variable resistor having a control lever connected to the control button whereby movement of the control button in the elongated slot moves the control lever of the variable resistor.

2. The electronic control panel of claim 1, wherein the movable control button comprises a shaft receptacle portion extending through the elongated slot and a control lever portion extending from the shaft receptacle portion.

3. The electronic control panel of claim 1, wherein the variable resistor is located out of alignment with a vertical plane passing through the elongated slot.

* * * * *